(12) United States Patent
Hayashi et al.

(10) Patent No.: US 12,313,281 B2
(45) Date of Patent: May 27, 2025

(54) HEAT EXCHANGER AND HEAT EXCHANGE VENTILATOR

(71) Applicant: Mitsubishi Electric Corporation, Tokyo (JP)

(72) Inventors: Toshiaki Hayashi, Tokyo (JP); Hajime Sotokawa, Tokyo (JP); Shinya Morikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 18/001,492

(22) PCT Filed: Jul. 15, 2020

(86) PCT No.: PCT/JP2020/027507
§ 371 (c)(1),
(2) Date: Dec. 12, 2022

(87) PCT Pub. No.: WO2022/013972
PCT Pub. Date: Jan. 20, 2022

(65) Prior Publication Data
US 2023/0221034 A1 Jul. 13, 2023

(51) Int. Cl.
*F24F 12/00* (2006.01)
*F24F 7/08* (2006.01)
(Continued)

(52) U.S. Cl.
CPC .............. *F24F 12/006* (2013.01); *F24F 7/08* (2013.01); *F24F 13/20* (2013.01); *F28D 21/0014* (2013.01); *F28F 9/002* (2013.01)

(58) Field of Classification Search
CPC . F24F 7/08; F24F 12/006; F24F 13/20; F28D 9/00; F28F 9/002
See application file for complete search history.

(56) References Cited

U.S. PATENT DOCUMENTS 4,596,285 A * 6/1986 Dinulescu ............... F28F 9/001
165/69
4,805,695 A * 2/1989 Ishikawa ............... F28D 9/0037
165/DIG. 393

(Continued)

FOREIGN PATENT DOCUMENTS

JP   H09178387 A    7/1997
JP   2015-114013 A  6/2015
(Continued)

OTHER PUBLICATIONS

Machine translation of WO 2017/141444 A1 (Year: 2024).*

(Continued)

*Primary Examiner* — Eric S Ruppert
*Assistant Examiner* — Hans R Weiland
(74) *Attorney, Agent, or Firm* — BUCHANAN, INGERSOLL & ROONEY PC

(57) ABSTRACT

A heat exchanger that performs heat exchange between a supply air flow and an exhaust air flow includes: a heat exchange element in a prism shape; a plurality of frame bars, each of the plurality of frame bars being attached to a corresponding side of the heat exchange element, the corresponding side extending along an axial direction of the heat exchange element; and an end face plate at least partially covering an axial end face of the heat exchange element, the plurality of frame bars being joined to the end face plate. The frame bars are joined to the end face plate in such a way as to be movable in the axial direction of the heat exchange element.

7 Claims, 10 Drawing Sheets

(51) Int. Cl.
*F24F 13/20* (2006.01)
*F28D 21/00* (2006.01)
*F28F 9/00* (2006.01)

(56) References Cited

U.S. PATENT DOCUMENTS

| | | | | |
|---|---|---|---|---|
| 4,848,450 | A * | 7/1989 | Lapkowsky | F28F 9/001 165/DIG. 383 |
| 5,322,117 | A * | 6/1994 | Guetersloh | F28F 9/001 165/82 |
| 5,383,516 | A * | 1/1995 | Dinulescu | F28D 9/0062 165/82 |
| 5,660,228 | A * | 8/1997 | Steege | F28F 9/001 165/145 |
| 10,907,856 | B2 * | 2/2021 | Momose | F28F 3/08 |
| 11,002,462 | B2 | 5/2021 | Tsuda et al. | |
| 2019/0285308 | A1 | 9/2019 | Tsuda et al. | |

FOREIGN PATENT DOCUMENTS

| | | | |
|---|---|---|---|
| JP | 6482688 B2 | 3/2019 | |
| WO | 2017098788 A1 | 6/2017 | |
| WO | 2017141445 A1 | 8/2017 | |
| WO | WO-2017141444 A1 * | 8/2017 | ............ D21H 15/02 |

OTHER PUBLICATIONS

International Search Report (PCT/ISA/210) with translation and Written Opinion (PCT/ISA/237) mailed on Sep. 15, 2020, by the Japan Patent Office as the International Searching Authority for International Application No. PCT/JP2020/027507. (8 pages).

Notice of Reasons for Refusal dated May 16, 2023, issued in the corresponding Japanese Patent Application No. 2022-536040, 9 pages including 5 pages of English Translation.

First Office Action dated Feb. 25, 2025, issued in the corresponding Chinese Patent Application No. 202080102772.X, 12 pages including 6 pages of English Translation.

* cited by examiner

HEAT EXCHANGER AND HEAT EXCHANGE VENTILATOR

FIELD

The present disclosure relates to a heat exchanger and a heat exchange ventilator that perform heat exchange between a supply air flow and an exhaust air flow.

BACKGROUND

In recent years, with the development and spread of air conditioning devices for heating, cooling, and the like, the importance of a heat exchange ventilator including a heat exchanger capable of recovering temperature and humidity in ventilation is also increasing as a residential area where air conditioning devices are used expands. Some heat exchangers use a heat exchange element including a plurality of partition plates stacked in multiple layers. The partition plates have heat conductivity and moisture permeability, and have spacing plates sandwiched therebetween so as to leave spaces therebetween. The partition plate is a square-shaped flat plate, and the spacing plate is a corrugated plate with wavy folds. The projected planform of the spacing plate coincides with that of the partition plate. The corrugation of the corrugated plate is formed in, for example, a saw-tooth wave-like shape or sine wave-like shape. As a result of stacking partition plates and spacing plates, the heat exchange element is formed in a quadrangular prism shape. In the heat exchanger, spacing plates provided on both surfaces of a partition plate are disposed in such a way as to be shifted from each other at an angle of 90 degrees or an angle close to 90 degrees in the direction of corrugation. As a result, fluid passages of two lines through which a primary air flow and a secondary air flow pass are provided in every other interlayer space between the layers of the heat exchange element.

In some cases, the strength of a heat exchanger is ensured by a frame bar provided on sides extending along an axial direction of a heat exchange element having a quadrangular prism shape, or a cover member provided in such a way as to cover an end face perpendicular to the axial direction. Generally, the partition plate and the spacing plate are formed of specially treated paper. As a result of being repeatedly dried and moistened by air passing through the heat exchanger, the partition plate and the spacing plate tend to shrink with long-term use. Therefore, due to the shrinkage of the partition plate and the spacing plate, the heat exchange element may be reduced in size, the frame bar may be deformed, or the frame bar bonded to the heat exchange element may come off. Due to deformation or the like of the frame bar, the fluid passage through which the primary air flow passes and the fluid passage through which the secondary air flow passes may communicate with each other. Due to the communication of the fluid passages with each other, there has been such problems as: a ventilation air volume may change; pollutant contained in an exhaust air flow may be mixed into a supply air flow; and heat-exchange efficiency may decrease.

Therefore, Patent Literature 1 discloses a heat exchanger in which a frame bar is connected to a cover member in such a way as to be movable in a direction perpendicular to an axial direction. In the heat exchanger disclosed in Patent Literature 1, the frame bar moves in the direction perpendicular to the axial direction in accordance with the shrinkage of a heat exchange element in the direction perpendicular to the axial direction, so as to prevent the frame bar from, for example, coming off.

CITATION LIST

Patent Literature

Patent Literature 1: Japanese Patent No. 6482688

SUMMARY

Technical Problem

However, the heat exchange element may be reduced in size in the axial direction due to the shrinkage of a spacing plate. The heat exchanger disclosed in Patent Literature 1 cannot cope with the shrinkage of the heat exchange element in the axial direction.

The present disclosure has been made in view of the above, and an object of the present disclosure is to obtain a heat exchanger capable of coping with the shrinkage of a heat exchange element in an axial direction.

Solution to Problem

To solve the above problems and achieve the object a heat exchanger according to the present disclosure is adapted to perform heat exchange between a supply air flow and an exhaust air flow. The heat exchanger includes: a heat exchange element in a prism shape; a plurality of frame bars, each of the plurality of frame bars being attached to a corresponding side of the heat exchange element, the corresponding side extending along an axial direction of the heat exchange element; and an end face plate adapted to cover at least partially an axial end face of the heat exchange element, and the plurality of frame bars are joined to the end face. The frame bars are joined to the end face plate in such a way as to be movable in the axial direction of the heat exchange element.

Advantageous Effects of Invention

The present disclosure achieves the effect of making it possible to obtain a heat exchanger capable of coping with the shrinkage of a heat exchange element in an axial direction.

DESCRIPTION OF EMBODIMENTS

Hereinafter, a heat exchanger and a heat exchange ventilator according to an embodiment will be described in detail with reference to the drawings.

First Embodiment

Figure 1:
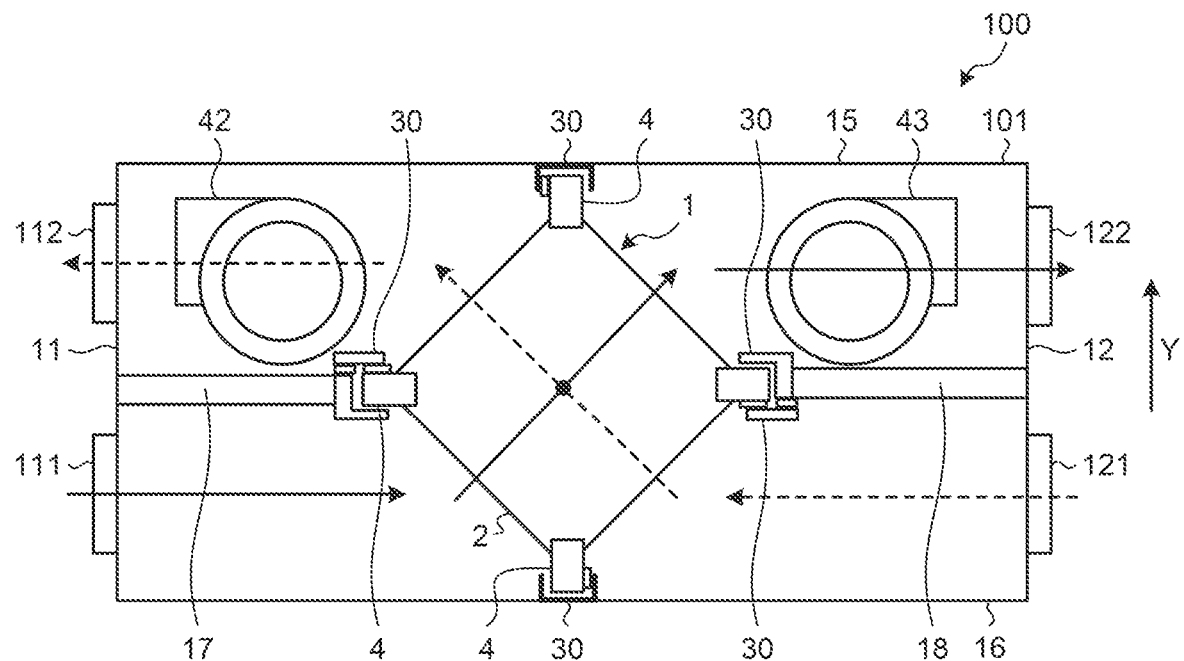
FIG. 1 is a schematic front view of a heat exchange ventilator according to a first embodiment.
Figure 2:
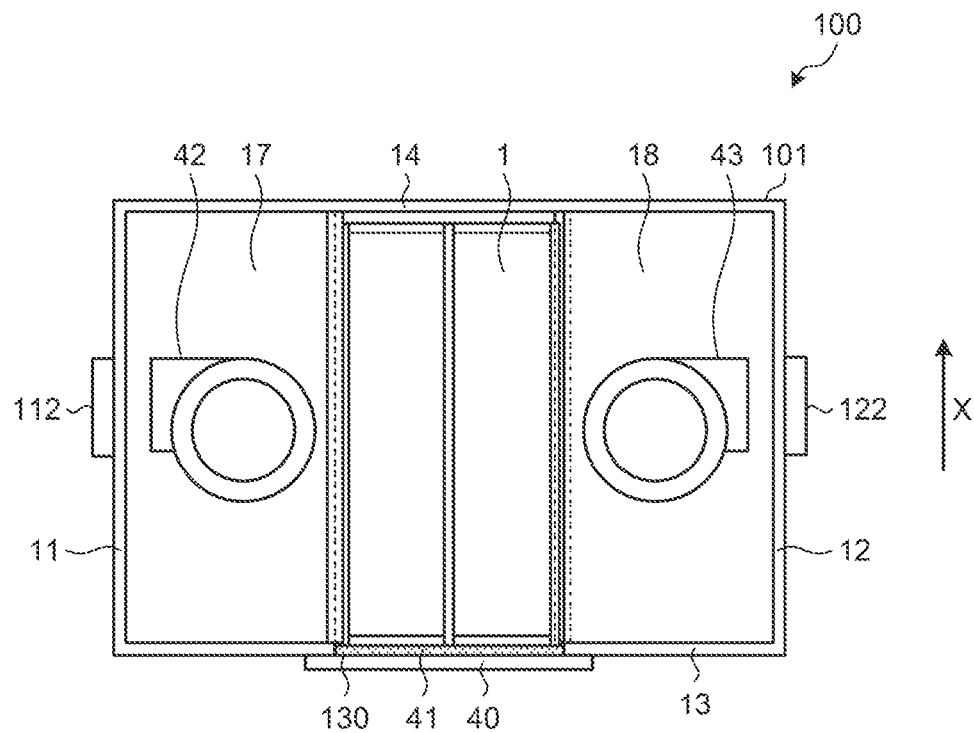
FIG. 2 is a schematic plan view of the heat exchange ventilator according to the first embodiment.

FIG. 1 is a schematic front view of a heat exchange ventilator according to a first embodiment. FIG. 2 is a schematic plan view of the heat exchange ventilator according to the first embodiment. A heat exchange ventilator 100 is a total heat exchange ventilator that is installed in a space behind a ceiling, and supplies and exhausts air through a duct (not illustrated). The heat exchange ventilator 100 includes a housing 101, a heat exchanger 1, and a plurality of support portions 30. The housing 101 forms an enclosure. The heat exchanger 1 has a prism shape (quadrangular prism shape in the first embodiment), and is removably inserted and accommodated in the housing 101. The plurality of support portions 30 supports the heat exchanger 1 in the housing 101.

The housing 101 is formed as a hexahedron including: a first side plate 11; a second side plate 12 that faces the first side plate 11, and is disposed on an indoor side; a third side plate 13 that extends between the first side plate 11 and the second side plate 12; a fourth side plate 14 that faces the third side plate 13, and extends between the first side plate 11 and the second side plate 12; a top plate 15 that is attached to the tops of the first side plate 11, the second side plate 12, the third side plate 13, and the fourth side plate 14; and a base plate 16 that is attached to the bottoms of the first side plate 11, the second side plate 12, the third side plate 13, and the fourth side plate 14. In a state where the heat exchange ventilator 100 is installed, the housing 101 is positioned such that the top plate 15 is located on the upper side in a vertical direction Y, and the base plate 16 is located on the lower side in the vertical direction Y.

The first side plate 11 is provided with: an outdoor-side inlet 111 that takes in outdoor air; and an outdoor-side exhaust port 112 that discharges indoor air to the outside of a room. In addition, the second side plate 12 is provided with: an indoor-side inlet 121 that takes in indoor air; and an indoor-side outlet 122 that supplies, into the room, outdoor air taken in through the outdoor-side inlet 111. As illustrated in FIG. 2, the third side plate 13 has a maintenance opening 130 through which the heat exchanger 1 can be inserted into and removed from the housing 101. Furthermore, a maintenance cover 40 that covers the maintenance opening 130 is detachably attached to the third side plate 13. A sealer 41 is attached to the inside of the maintenance cover 40. The sealer 41 abuts on an end face of the heat exchanger 1 and an inner peripheral surface of the maintenance opening 130.

The housing 101 includes a first casing 17 and a second casing 18 that define a supply air route and an exhaust air route as air routes that are independent from each other. The supply air route allows the outdoor-side inlet 111 and the indoor-side outlet 122 to communicate with each other, and allows a supply air flow to flow in directions indicated by solid arrows illustrated in FIG. 1. The exhaust air route allows the indoor-side inlet 121 and the outdoor-side exhaust port 112 to communicate with each other, and allows an exhaust air flow to flow in directions indicated by broken arrows illustrated in FIG. 1. The first casing 17 holds an exhaust blower 42 that: is disposed in a halfway of the exhaust air route; and generates an exhaust air flow. In addition, the second casing 18 holds an air supply blower 43 that: is disposed in a halfway of the supply air route; and generates a supply air flow.

As illustrated in FIG. 1, in the central part of the housing 101, the heat exchanger 1: is disposed in the middle of the supply air route and in the middle of the exhaust air route; and forms a part of the supply air route and a part of the exhaust air route. As illustrated in FIG. 1, the heat exchanger 1 is supported by the plurality of support portions 30 fixed to the housing 101.

Figure 3:
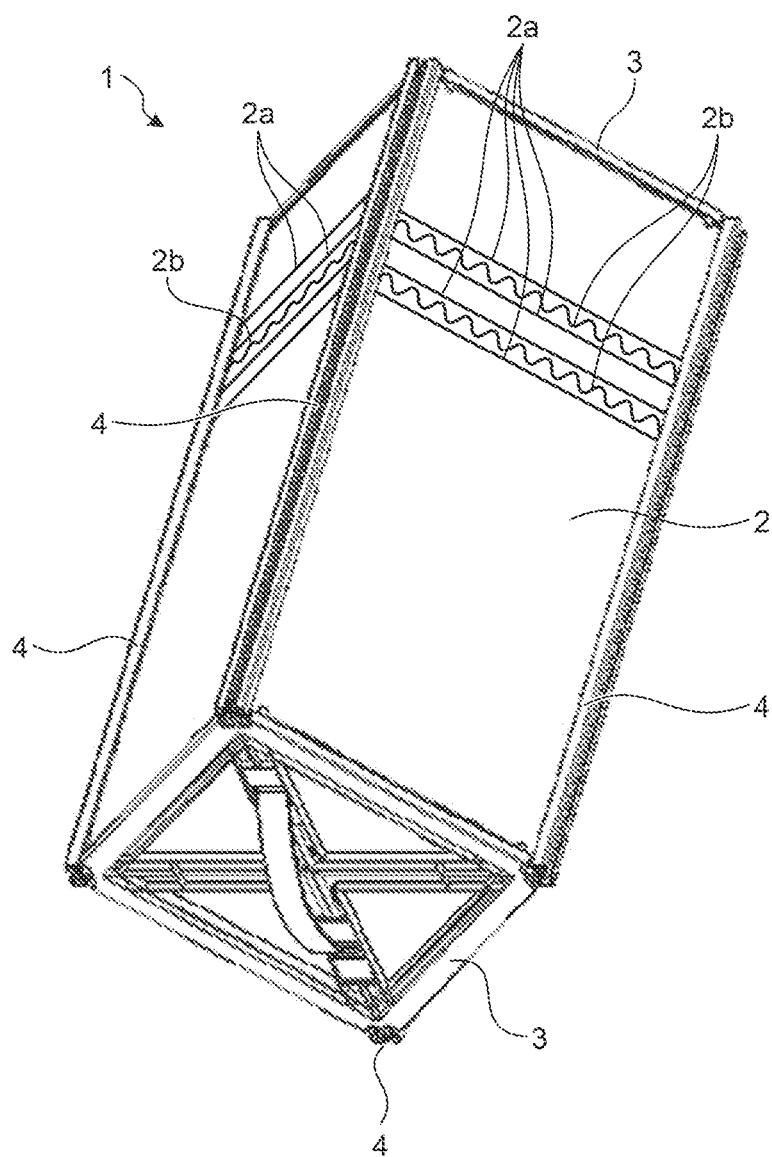
FIG. 3 is a perspective view of a heat exchanger according to the first embodiment.

A configuration of the heat exchanger 1 according to the first embodiment will be described. FIG. 3 is a perspective view of the heat exchanger according to the first embodiment. The heat exchanger 1 includes a heat exchange element 2 in a prism shape. The heat exchange element 2 is formed such that the heat exchange element 2 includes: a plurality of partition plates 2a having heat conductivity and moisture permeability; and spacing plates 2b sandwiched between the partition plates 2a. The heat exchange element 2 includes the plurality of partition plates 2a stacked in multiple layers. The spacing plates 2b provide spaces between the partition plates 2a. The partition plate 2a is a square-shaped flat plate, and the spacing plate 2b is a corrugated plate with wavy folds. The projected planform of the spacing plate 2b coincides with that of the partition plate 2a. The corrugation of the spacing plate 2b is formed in, for example, a saw-tooth wave-like shape or sine wave-like shape. As a result of stacking the partition plates 2a and the spacing plates 2b, the heat exchange element 2 is formed in a quadrangular prism shape. In the heat exchange element 2, the spacing plates 2b provided on both surfaces of the partition plate 2a are disposed in such a way as to be shifted from each other at an angle of 90 degrees or an angle close to 90 degrees in the direction of corrugation. As a result, fluid passages of two lines through which a primary air flow and a secondary air flow pass are provided in every other interlayer space between the layers of the heat exchange element 2.

An end face plate 3 is installed on each end face of the heat exchange element 2. A frame bar 4 is installed on each side extending along an axial direction of the prism-like structure of the heat exchange element 2. The end face plate 3 and the frame bar 4 are fixed by a joining structure to be described below, and are fixed to the heat exchange element 2. At this time, a space between the frame bar 4 and the heat exchange element 2, and a joint between the end face plate 3 and the heat exchange element 2 may be filled with a sealing material or an adhesive, and fixed.

Figure 4:
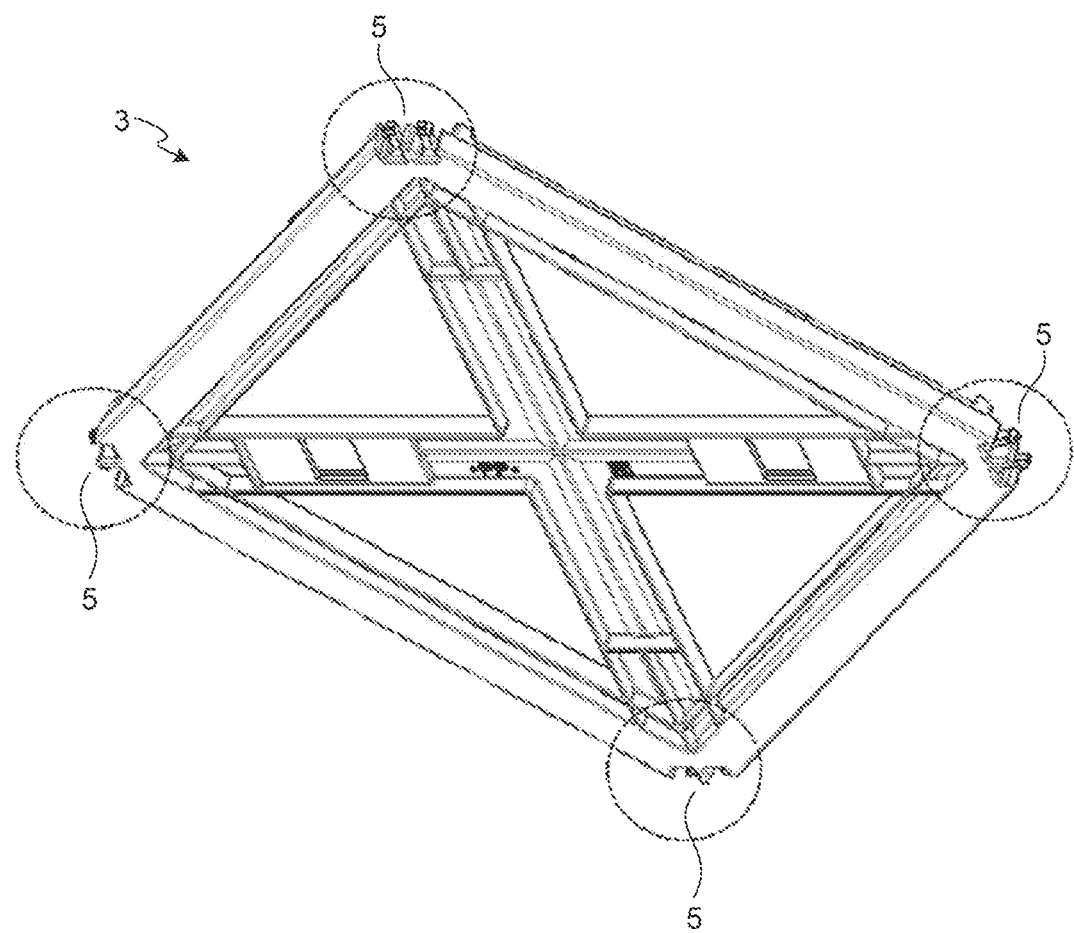
FIG. 4 is a perspective view of an end face plate in the first embodiment.

FIG. 4 is a perspective view of the end face plate in the first embodiment. Since the end face plate 3 is installed on the end face of the heat exchange element 2, the end face plate 3 has a flat plate shape. In addition, a joint 5 where the end face plate 3 is joined to the frame bar 4 is provided at a corner of each side of the end face plate 3. The joint 5 is provided at each of four positions corresponding to the corners. As a result, the end face plate 3 and the frame bars 4 can be assembled in a box shape. The end face plate 3 may be formed as an injection-molded article, and acrylonitrile butadiene styrene (ABS) or polypropylene (PP) may be used as a material.

Figure 5:
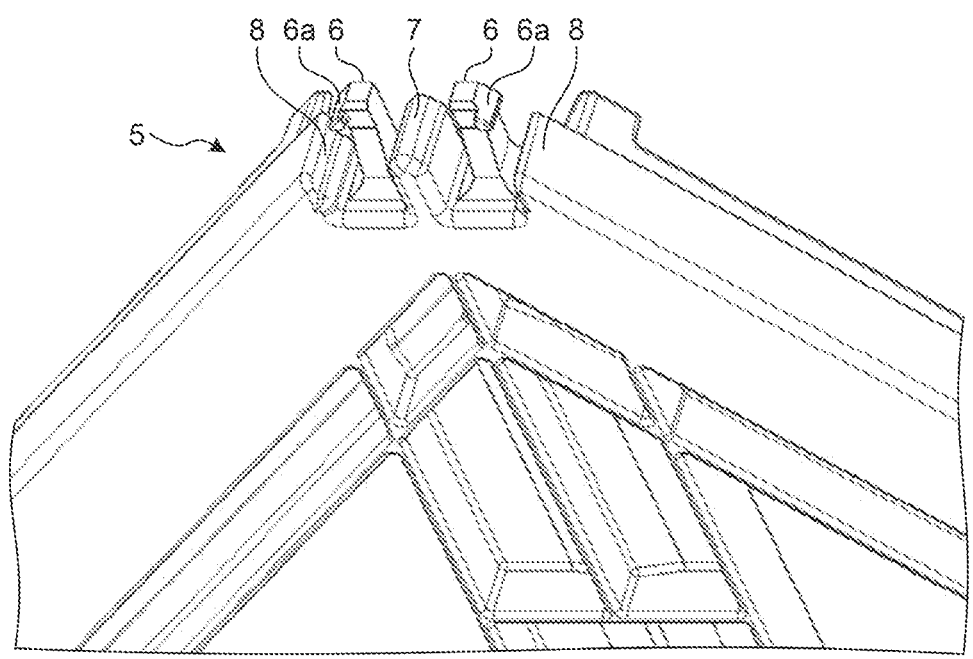
FIG. 5 is an enlarged view of a joint of the end face plate in the first embodiment.

FIG. 5 is an enlarged view of the joint of the end face plate in the first embodiment. The joint 5 has two claws 6 which are joined to the frame bar 4 by a snap-fit structure. The two claws 6 are formed at each corner of the end face plate 3, and are arranged side by side in such a way to have a space between the two claws 6. The claws 6 are projections to be inserted into the frame bar 4. The end face plate 3 and the frame bar 4 are joined by insertion of the claws 6 into the frame bar 4. Space walls 8 along which the frame bar 4 enters are provided on both sides of the claws 6 that are arranged side by side. A protrusion 7 protruding in the same direction as the two claws 6 is provided between the two claws 6. As will be described in detail below, the end face plate 3 and the frame bar 4 are movably joined to each other. In order to provide such a structure that enables the end face plate 3 and the frame bar 4 to be movably joined, it is necessary to provide a space for allowing the frame bar 4 to move. However, as a result of providing the space, an air flow tends to leak through the space when the heat exchanger 1 is installed in the heat exchange ventilator 100. Therefore, the protrusion 7 is provided between the two claws 6 to suppress the flow of air passing through the space, and to suppress air flow leakage. With the protrusion 7, it is possible to form a wall in a space for providing the structure that enables the end face plate 3 and the frame bar 4 to be movably joined, so that it is possible to suppress air flow leakage. Note that the length of the protrusion 7 along the axial direction is longer than the length of the claw 6 along the axial direction. This makes it possible to more reliably prevent air flowing through a joint hole formed in the frame bar 4 to be described below from leaking to another flow path. Note that a catching protrusion 6a is provided at the tip of the claw 6.

Figure 6:
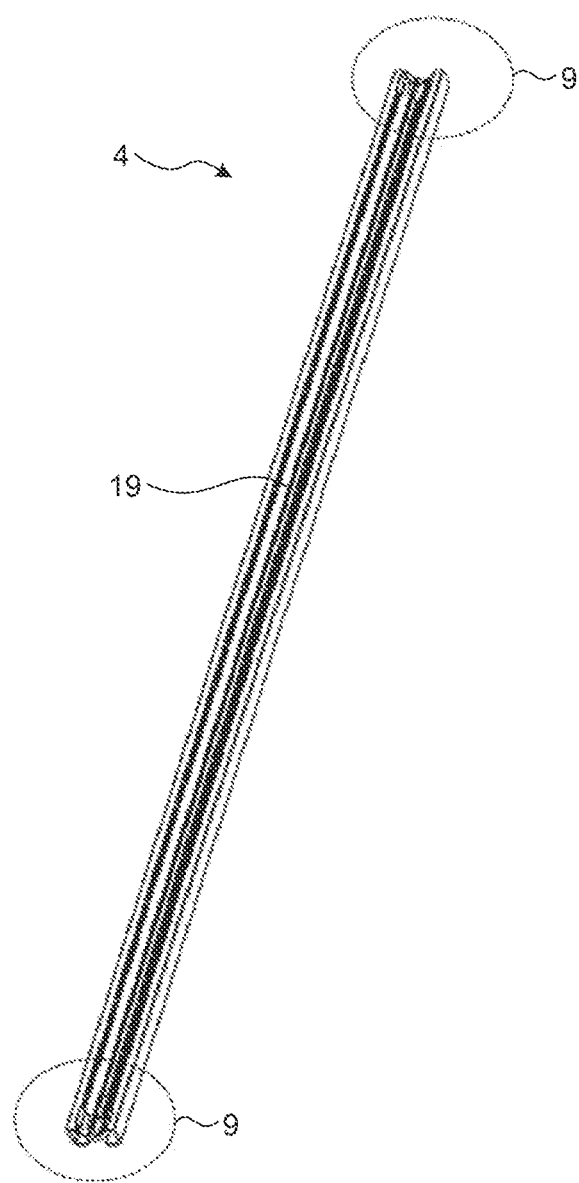
FIG. 6 is a perspective view of a frame bar in the first embodiment.

FIG. 6 is a perspective view of the frame bar in the first embodiment. The frame bar 4 has a rod shape, and has a V-shaped bonding surface 19 (see also FIG. 9). The bonding surface 19 is joined to each side of the heat exchange element 2, the side extending in the axial direction of the heat exchange element 2. In a case where the axial dimension of the heat exchange element 2 changes, it is possible to change the length of the frame bar 4 so as to cope with the change in the dimension. Furthermore, a joint 9 is provided at each end of the frame bar 4. The joint 9 allows the frame bar 4 to be joined to the end face plate 3. The frame bar 4 may be formed by injection molding or extrusion molding. ABS, PP, or the like may be used as a material of the frame bar 4. Furthermore, in a case where the frame bar 4 is formed as an extruded article, dimension adjustment can be freely performed even if the axial size of the heat exchange element 2 is changed.

Figure 7:
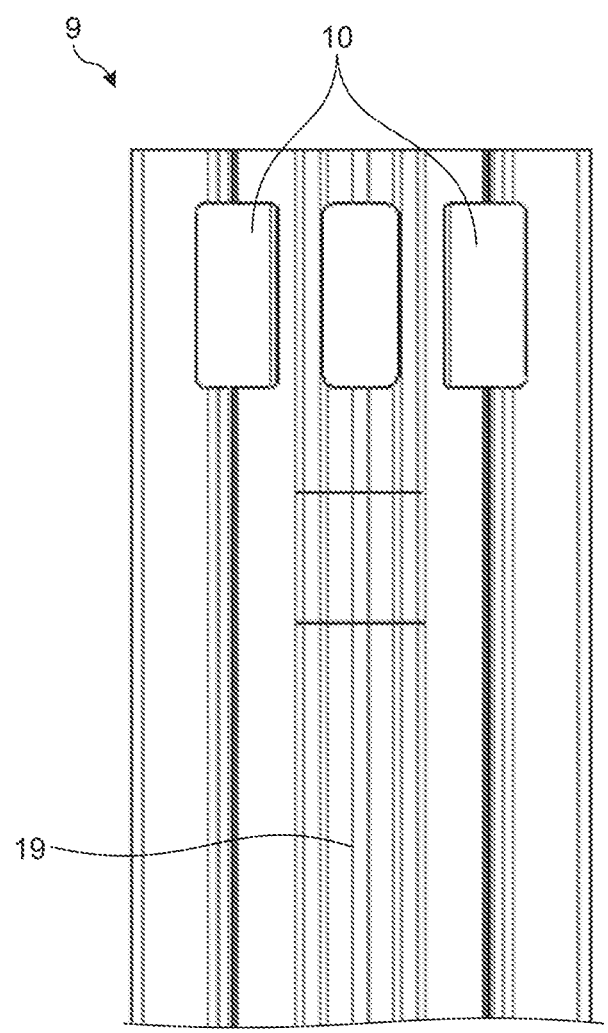
FIG. 7 is an enlarged view of a joint of the frame bar in the first embodiment.

FIG. 7 is an enlarged view of the joint of the frame bar in the first embodiment. Joint holes 10 that are openings are provided in the joint 9 of the frame bar 4. When the claws 6 of the end face plate 3 are inserted into the joint holes 10, the catching protrusions 6a are caught by the edges of the joint holes 10 due to the snap-fit structure. As a result, the claws 6 are prevented from falling off the joint holes 10.

Figure 8:
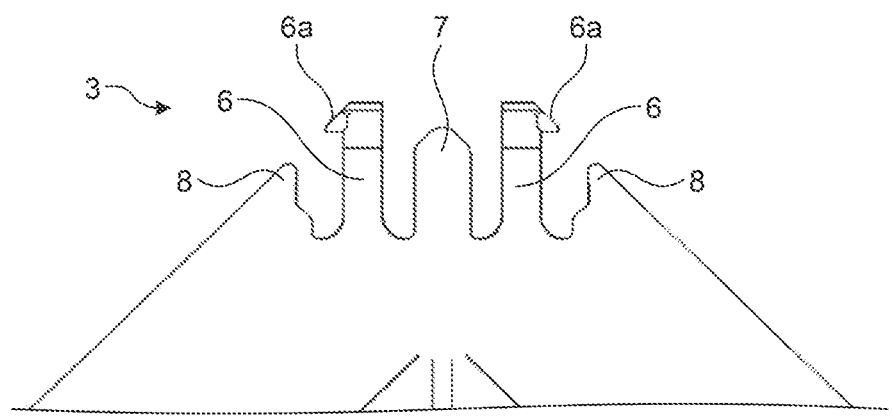
FIG. 8 is an external view of the end face plate in the first embodiment as viewed from an end face side.
Figure 9:
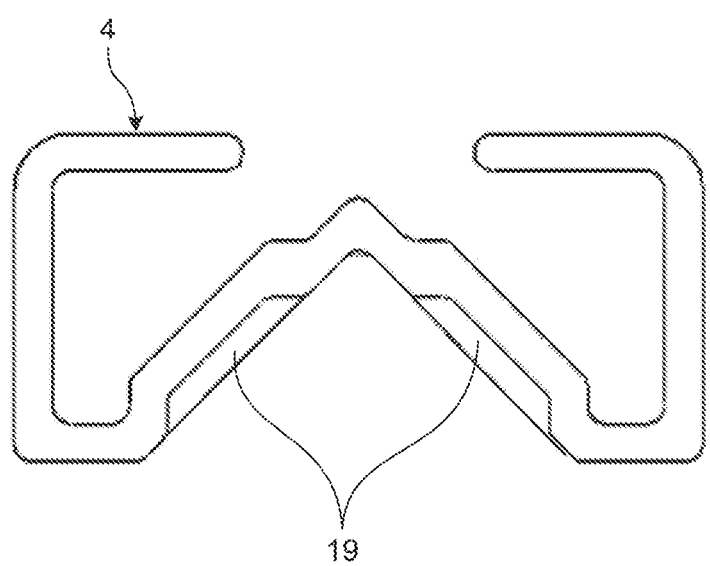
FIG. 9 is an external view of the frame bar in the first embodiment as viewed from an end face direction.
Figure 10:
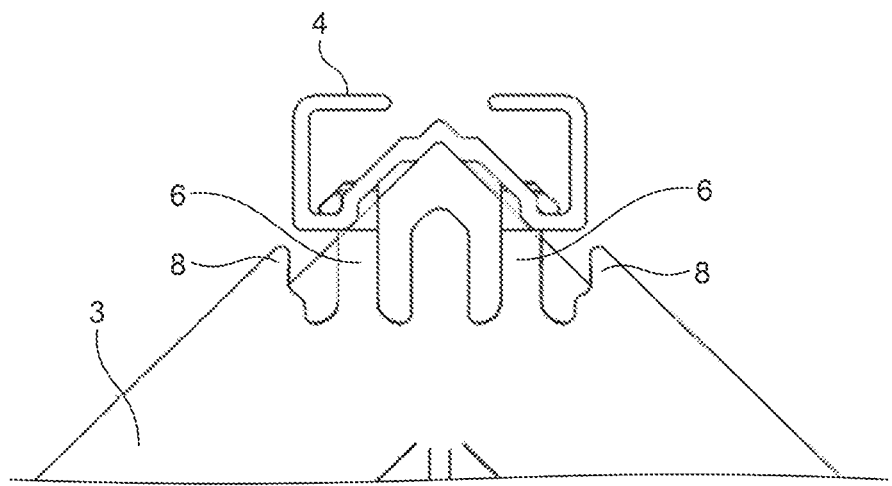
FIG. 10 is an enlarged view of a structure that enables the joint of the heat exchanger according to the first embodiment to move in a direction perpendicular to an axial direction.
Figure 11:
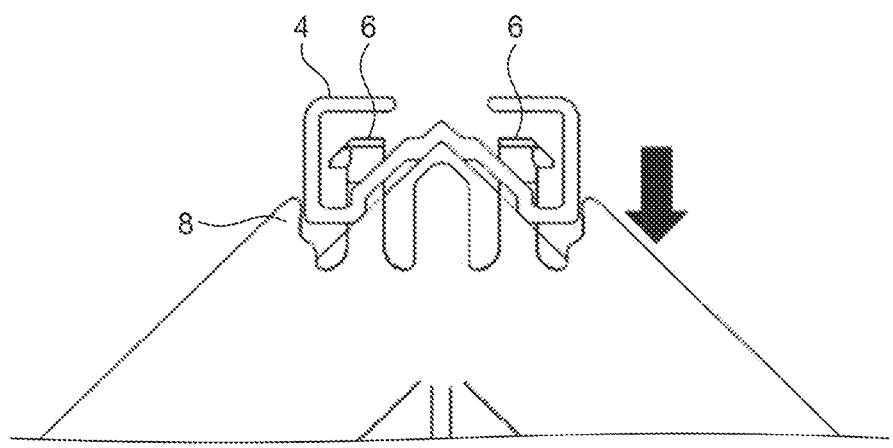
FIG. 11 is an enlarged view of the structure that enables the joint of the heat exchanger according to the first embodiment to move in the direction perpendicular to the axial direction.
Figure 12:
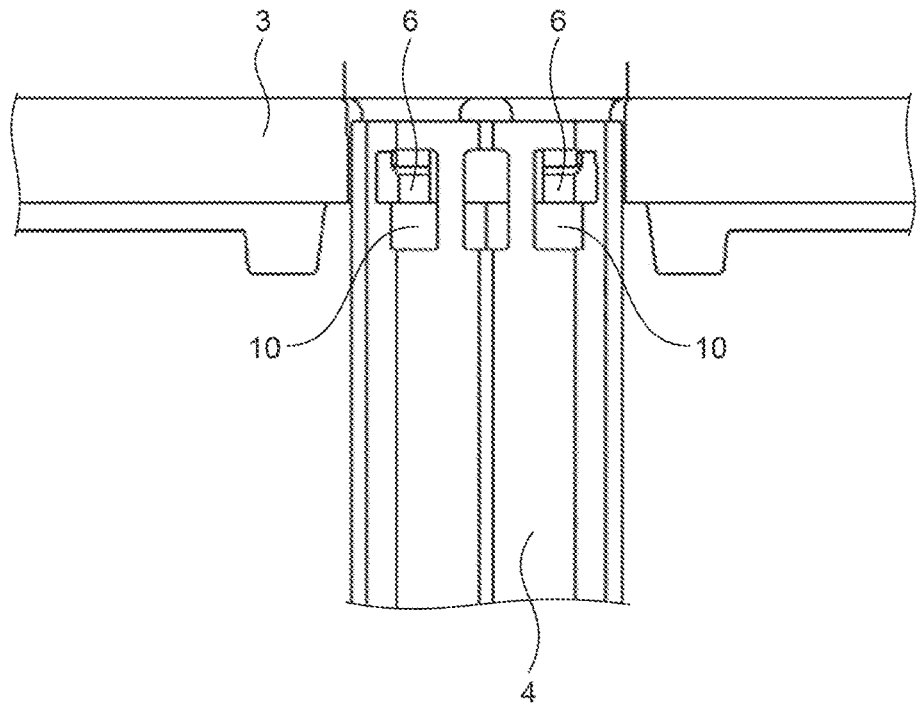
FIG. 12 is an enlarged view of a structure that enables the joint of the heat exchanger according to the first embodiment to move in the axial direction.
Figure 13:
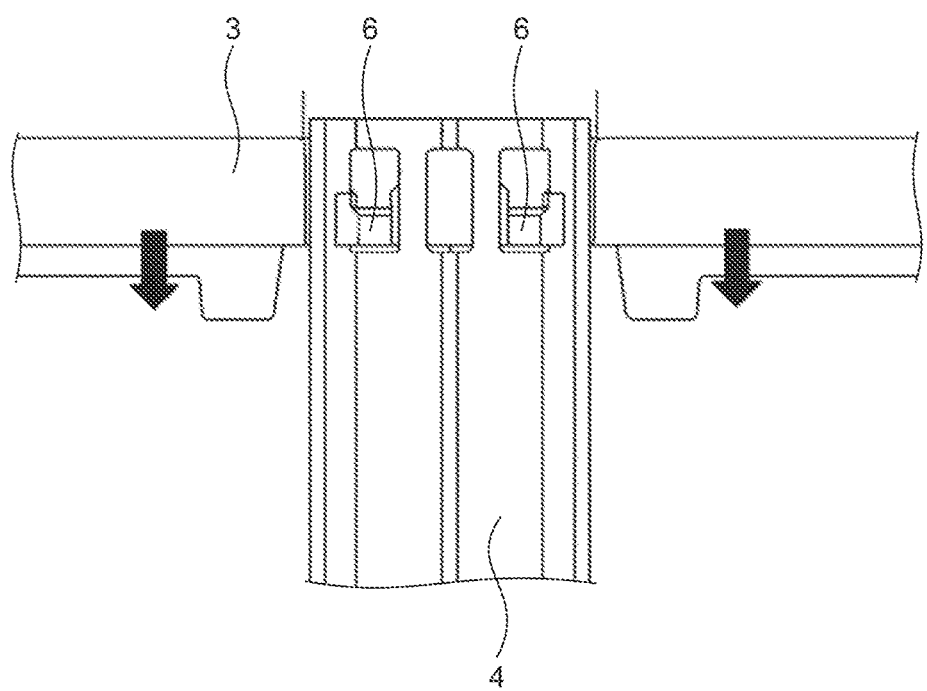
FIG. 13 is an enlarged view of the structure that enables the joint of the heat exchanger according to the first embodiment to move in the axial direction.
Figure 14:
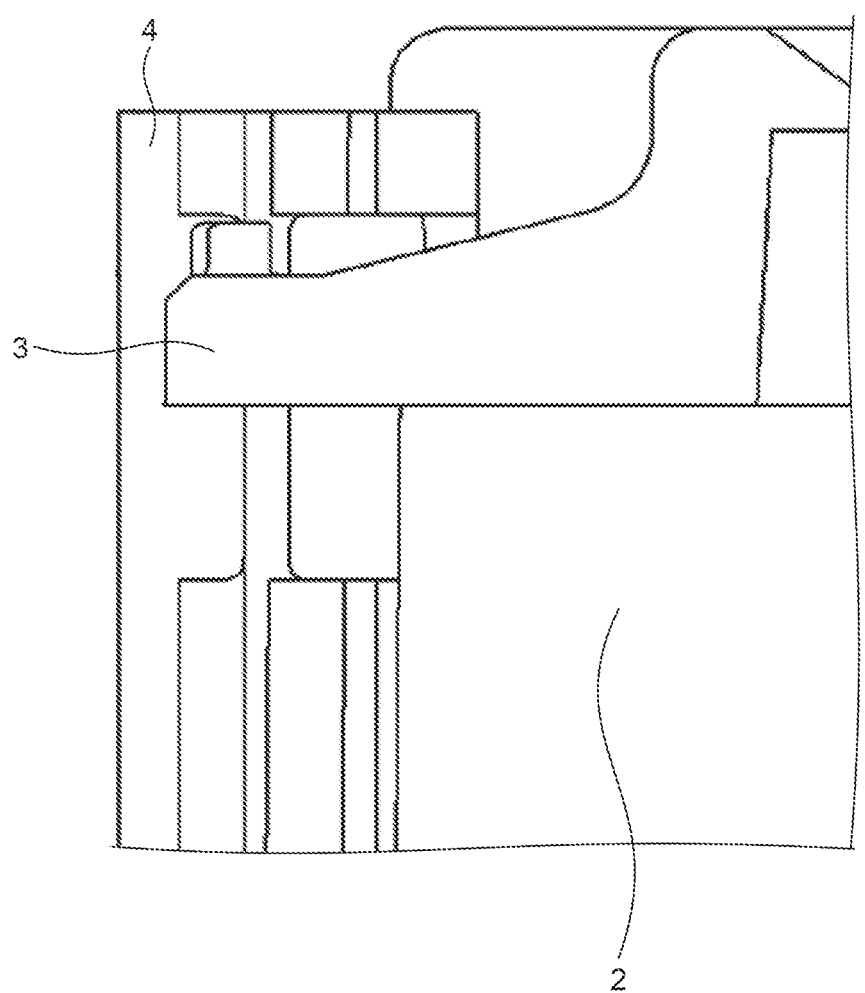
FIG. 14 is an enlarged cross-sectional view of the joint of the heat exchanger according to the first embodiment taken along a longitudinal direction of a claw.

FIG. 8 is an external view of the end face plate in the first embodiment as viewed from an end face side, FIG. 9 is an external view of the frame bar in the first embodiment as viewed from an end face direction, FIGS. 10 and 11 are enlarged views of a structure that enables the joint of the heat exchanger according to the first embodiment to move in a direction perpendicular to the axial direction. FIGS. 10 and 11 are diagrams illustrating a state of the joining of the end face plate 3 and the frame bar 4 viewed from the end face direction. When the claws 6 of the end face plate 3 are inserted into the joint holes 10 of the frame bar 4, the catching protrusions 6a are caught. As a result, the end face plate 3 and the frame bar 4 are joined. At this time, spaces are provided by the space walls 8. When the heat exchange element 2 shrinks in the direction perpendicular to the axial direction due to the long-term use of the heat exchange ventilator 100, the frame bar 4 can enter the spaces as illustrated in FIG. 11. As a result, the frame bar 4 can follow the shrink of the heat exchange element 2. It is thus possible to prevent a gap from being generated between the heat exchange element 2 and the frame bar 4. Therefore, it is possible to prevent the occurrence of air flow leakage from between the heat exchange element 2 and the frame bar 4. A length from the catching protrusion 6a of the claw 6 to the root of the claw 6 is longer than the thickness of a portion of the frame bar 4 where the joint hole 10 is formed. This achieves such movement of the frame bar 4 in the direction perpendicular to the axial direction, FIGS. 12 and 13 are enlarged views of a structure that enables the joint of the heat exchanger according to the first embodiment to move in the axial direction, FIGS. 12 and 13 illustrate a state in which the claws 6 of the end face plate 3 have been inserted into the joint holes 10 of the frame bar 4. FIG. 14 is an enlarged cross-sectional view of the joint of the heat exchanger according to the first embodiment taken along a longitudinal direction of the claw. As illustrated, the joint hole 10 is formed as an elongate hole elongated in the axial direction. In addition, the length of the claw 6 along the axial direction is shorter than the length of the joint hole 10 along the axial direction. As a result, a gap is provided between the claw 6 and the joint hole 10. The gap enables the claw 6 to move in the joint hole 10 in the axial direction of the heat exchange element 2. This gap allows the end face plate 3 to move in accordance with the position of the end face of the heat exchange element 2 even if the heat exchange element 2 shrinks and its axial dimension changes. Even when the axial dimension of the heat exchange element 2 shrinks due to the long-term use of the heat exchange ventilator 100, the end face plate 3 can follow the shrink of the heat exchange element 2 as illustrated in FIG. 13. Therefore, it is possible to prevent generation of a gap between the heat exchange element 2 and the end face plate 3. Accordingly, it is possible to prevent the occurrence of air flow leakage from between the heat exchange element 2 and the end face plate 3.

Note that a claw may be provided on the frame bar 4, and a joint hole may be provided in the end face plate 3. In this case, it is possible to omit the step of forming the joint hole after the injection molding of the frame bar 4.

Furthermore, although not illustrated, the central part of the frame bar 4 may be divided to provide a joint movable in the axial direction of the heat exchange element 2 with a snap-fit structure so that the same function as described above may be achieved.

According to the heat exchange ventilator 100 described above, even if the heat exchange element 2 shrinks in two directions, that is, the axial direction and the direction perpendicular to the axial direction due to the long-term use of the heat exchanger 1, it is possible to suppress generation of gaps between the heat exchange element 2 and the end face plate 3 and between the heat exchange element 2 and the frame bar 4. This makes it possible to suppress an increase in air flow leakage due to long-term use. In addition, since the end face plate 3 is movable along the axial direction, the accuracy of dimensional adjustment of the heat exchange element 2 is also relaxed at the time of framing, so that the ease of assembly of the heat exchanger 1 can be improved.

The configurations set forth in the above embodiment show examples, and it is possible to combine the configurations with another known technique or combine modifications with each other, and is also possible to partially omit or change the configurations without departing from the scope of the present disclosure.

REFERENCE SIGNS LIST 1 heat exchanger; 2 heat exchange element; 2a partition plate; 2b spacing plate; 3 end face plate; 4 frame bar; 5, 9 joint; 6 claw; 6a catching protrusion; 7 protrusion; 8 space wall; 10 joint hole; 11 first side plate; 12 second side plate; 13 third side plate; 14 fourth side plate; 15 top plate; 16 base plate; 17 first casing; 18 second casing; 19 bonding surface; 30 support portion; 40 maintenance cover; 41 sealer; 100 heat exchange ventilator; 101 housing; 111 outdoor-side inlet; 112 outdoor-side exhaust port; 121 indoor-side inlet; 122 indoor-side outlet; 130 maintenance opening.

The invention claimed is:

1. A heat exchanger adapted to perform heat exchange between a supply air flow and an exhaust air flow, the heat exchanger comprising:
a heat exchange element in a prism shape;
a plurality of frame bars, each of the plurality of frame bars being attached to a corresponding side of the heat exchange element, the corresponding side extending along an axial direction of the heat exchange element; and
an end face plate adapted to cover at least partially an axial end face of the heat exchange element, and the plurality of frame bars are joined to the end face plate, wherein
the frame bars are joined to the end face plate in such a way as to be movable relative to the end face plate in the axial direction of the heat exchange element.

2. The heat exchanger according to claim 1, wherein
a gap is provided in a joint where the frame bar and the end face plate are joined, the gap is adapted to allow the end face plate to move along the axial direction of the heat exchange element.

3. The heat exchanger according to claim 2, wherein
at the joint, a projection is provided on one of the frame bar and the end face plate, and an opening is provided in another of the frame bar and the end face plate,
the projection is fitted into the opening, and
a length of the projection along the axial direction is shorter than a length of the opening along the axial direction.

4. The heat exchanger according to claim 3, wherein
a pair of the projections are formed and arranged side by side in such a way as to leave a space between the projections, and a protrusion is formed between the projections.

5. The heat exchanger according to claim 3, wherein
the projection is formed in a snap-fit shape.

6. The heat exchanger according to claim 2, wherein
the joint allows the frame bar to move along a direction perpendicular to the axial direction of the heat exchange element.

7. A heat exchange ventilator comprising:
the heat exchanger according to claim 1.

* * * * *